USOO5690407A

United States Patent [19]
Kikuchi et al.

[11] Patent Number: 5,690,407
[45] Date of Patent: Nov. 25, 1997

[54] SHUTTER FOR DISPLAY DEVICE OF PROJECTION TYPE

[75] Inventors: Nobuyuki Kikuchi, Tochigi-ken; Yoshiro Oikawa, Toyko; Tetsuo Hattori, Yokohama, all of Japan

[73] Assignee: Nikon Corporation, Toyko, Japan

[21] Appl. No.: 654,555

[22] Filed: May 29, 1996

[30] Foreign Application Priority Data

Dec. 13, 1995 [JP] Japan .................................. 7-346825

[51] Int. Cl.$^6$ ........................................ G03B 21/14
[52] U.S. Cl. ............................................. 353/88
[58] Field of Search ................... 353/88, 91, 97, 353/DIG. 4

[56] References Cited

U.S. PATENT DOCUMENTS

| 5,112,123 | 5/1992 | Fagan ........................... 353/88 |
| 5,121,984 | 6/1992 | Jones et al. ..................... 353/88 |

Primary Examiner—William Dowling
Attorney, Agent, or Firm—Shapiro and Shapiro

[57] ABSTRACT

A shutter has a cylindrical take-up member rotatable about the central shaft thereof, and a thin board having one end portion thereof fixed to the outer peripheral surface of the take-up member and deformable into a state rolled on the outer peripheral surface of the take-up member and having a spring force for returning to a flat state. The thin board is capable of operating between a liberating position in which in conformity with the rotated position of the take-up member, it is rolled onto the take-up member and retracts from a predetermined optical path to thereby permit the passage of light in the optical path and an intercepting position in which it is unrolled from the take-up member and assumes a flat shape and protrudes into the predetermined optical path to thereby intercept the light.

10 Claims, 5 Drawing Sheets

SHUTTER FOR DISPLAY DEVICE OF PROJECTION TYPE

BACKGROUND OF THE INVENTION

1. Field of the Invention

This invention relates to a shutter for effecting the interception and liberation of light running in the interior of a display device of the projection type.

2. Related Background Art

An example of the display device of the projection type according to the prior art will hereinafter be described with reference to FIG. 4 of the accompanying drawings. FIG. 4 is a perspective view schematically showing the construction of the display device of the projection type according to the prior art.

In this display device of the projection type according to the prior art, white light or beam emitted from a light source, not shown, becomes substantially parallel light via a parallel light shaping optical system, not shown, and is incident on a cross dichroic mirror 111, by which the white light is separated into three colors of lights or beams, i.e., R (red), G (green) and B (blue).

The blue light reflected by a dichroic mirror 111B for B light reflection changes its optical path just downwardly by a mirror 112B and enters a polarization beam splitter 115B. The S-polarized light or beam of the B light having entered the polarization beam splitter 115B is reflected by the polarization separating portion of the polarization beam splitter 115B and is annulled. On the other hand, P-polarized light transmitted through the polarization separating portion of the polarization beam splitter 115B enters a polarization beam splitter 114B disposed just beneath the polarization beam splitter 115B and disposed at an angle of 90° with respect to the polarization beam splitter 115B. Since the polarization beam splitter 114B is thus disposed with a deflection of 90°, the P-polarized light transmitted through the polarization beam splitter 115B enters the polarization beam splitter 114B as S-polarized light. The polarization beam splitter 114B reflects the S-polarized light and causes it to enter a spatial light modulating element 113B as read-out light.

Also, the R light separated by a dichroic mirror 111R, like the B light, is subjected to polarization separation by a polarization beam splitter 115R via a mirror 112R, and P-polarized light transmitted through a polarization beam splitter 115R enters a polarization beam splitter 114R as S-polarized light, and the S-polarized light reflected by the polarization beam splitter 114R enters a spatial light modulating element 113R for R light as read-out light.

Further, the G light transmitted through the cross dichroic mirror 111, like the B light and the R light, is subjected to polarization separation by a polarized beam splitter 115G via a mirror 112G, and P-polarized light transmitted through the polarization beam splitter 115G enters a polarization beam splitter 114G as S-polarized light, and the S-polarized light reflected by a polarization beam splitter 114G enters a spatial light modulating element 113G for G light as read-out light.

The spatial light modulating elements 113B, 113R and 113G are elements having the cross-sectional structure shown, for example, in FIG. 5 of the accompanying drawings. In FIG. 5, in the order from the write-in light side, there are a transparent glass substrate 201, transparent electrically conductive material film 202, a photoconductive material layer 203 formed of amorphous silicon hydride, a light intercepting layer 204 comprising CdTe film, a dielectric material reflecting mirror layer 205 comprising dielectric material multilayer film, liquid crystal oriented film 206, a light modulating layer 207 comprising a liquid crystal layer, a liquid crystal oriented layer 208, transparent electrically conductive material film 209 and a transparent glass substrate 210. In each of the spatial light modulating elements 113B, 113R and 113G, the read-out light of the S-polarized light having entered it is subjected to the modulating effect by write-in light from a write-in light source not shown, for each color, and emerges therefrom as P-polarized light correspondingly to the write-in light. The emergent lights from the spatial light modulating elements 113B, 113R and 113G for respective colors again enter the polarization beam splitters 114B, 114R and 114G, and only the P-polarized lights are transmitted through the polarization beam splitters 114B, 114R and 114G, and the B light and the R light are reflected by mirrors 116B and 116R and enter a dichroic prism 117 for compositing three colors, and are three-color-composited by this prism 117, and emerge from the prism 117 and are projected onto a screen, not shown, by a projection lens 118.

In the case of such a display device of the projection type, it is necessary to project R, G and B lights individually onto the screen and observe the color irregularity or the like of the projected light of each color during assembly adjustment and after assembly. Therefore, in the aforedescribed display device of the projection type according to the prior art, when for example, it is desired to project only the B light, there has been adopted a method whereby the write-in light is not caused to enter the spatial light modulating elements for the R light and the G light, whereby the R light and the G light are prevented from entering the three color compositing dichroic prism 117 and as a result, only the B light is projected onto the screen.

However, in the method of individually projecting the R, G and B lights adopted in the aforedescribed display device of the projection type according to the prior art, there have been the following problems. Though the spatial light modulating elements 113B, 113R and 113G have the function of modulating the read-out light from S-polarized light to P-polarized light depending on the presence/absence of the write-in light, the read-out light is not converted from S-polarized light to complete P-polarized light, but the emergent lights from the spatial light modulating elements 113B, 113R and 113G become polarized lights which should be called elliptically polarized lights rather than linearly polarized lights, due to the irregularity or the like of the layer thickness of the light modulating layer 207 comprising a liquid crystal layer. Therefore, complete S-polarized lights and P-polarized light could not be made to emerge from the spatial light modulating elements 113B, 113R and 113G, and there could not be realized a complete black state, i.e., a state in which the light projected toward the screen became zero. That is, even if the write-in light is rendered null, the read-out light does not emerge intactly as complete S-polarized light, but emerges with P-polarized light partly mixed therewith and therefore, the P-polarized component having emerged passes through the polarization beam splitters 114B, 114R and 114G acting as analyzers and are projected onto the screen. Further, since the polarization beam splitters 114B, 114R and 114G do not have an ideal polarization separating characteristic, but have a predetermined polarization separating characteristic, there cannot be realized a complete black state. Thus, a monochromatic light examination by projecting only a monochromatic light of each color has been incomplete because actually other colors are mixed with the monochromatic light.

So, as a method of projecting the R, G and B lights individually in the display device of the projection type, it would occur to mind to provide three light sources emitting read-out lights for respective colors, correspondingly to respective colors, and turn off two of these three light sources. In this case, however, when the light sources are once turned off, it takes much time to turn on them again and much more time is required for the luminosity of the light sources to become stable after the turn-on, and this method cannot be practically adopted.

So, it is considered that if a shutter for intercepting the optical path of each color is disposed in the optical path of each color light, each color light can be individually projected completely independently of the other color lights and the changeover time required for changing the projected color light can be shortened.

However, in the display device of the projection type as shown in the aforedescribed example of the prior art, compactness is usually contrived to the utmost and therefore, the space for intercepting the internal optical paths is very small. Further, the display device of the projection type itself is encased and therefore, it is practically very difficult in terms of the space and the required time to open the case and expose the interior thereof and manually disposed the shutter members therein.

SUMMARY OF THE INVENTION

The present invention has been made in view of the above-described circumstances and has as its object to provide a shutter for a display device of the projection type which can be installed in a display device of the projection type, thereby enabling to individually project each color light completely independently of the other colors and does not require so much time for the changeover of the color light to be projected and moreover can be mounted in a narrow space.

To solve the above-noted problems, a shutter for a display device of the projection type according to a first mode of the present invention is provided with a column-like or cylindrical take-up member or roll rotatable about the central shaft thereof, and a light intercepting thin board member having one end portion thereof fixed to the outer peripheral surface of the take-up member and deformable into a state rolled on the outer peripheral surface of the take-up member and having a spring force for returning to a flat state, and during the forward rotation of the take-up member, said light intercepting thin board member is taken up (i.e., rolled) onto the take-up member and retracts from a desired light intercepting position to thereby bring light into a liberated state, and during the reverse rotation of the take-up member, the light intercepting thin board member is unrolled from the take-up member and assumes a flat state and moves forward to said light intercepting position to thereby bring the light into an intercepted state.

A shutter for a display device of the projection type according to a second mode of the present invention is a shutter for a display device of the projection type according to the first mode wherein the outer circumference length of the take-up member is greater than the movement stroke of the light intercepting thin board member between said liberating state and the intercepting state.

A shutter for a display device of the projection type according to a third mode of the present invention is a shutter for a display device of the projection type according to the first or second mode which is provided with guide means for guiding the light intercepting thin board member so that the light intercepting thin board member, with a predetermined angular position about the central shaft of said take-up member as a reference, may be substantially along the outer peripheral surface of the take-up member on said forward rotation side relative to said predetermined angular position and may be substantially along a predetermined plane on said reverse rotation side relative to said predetermined angular position.

A shutter for a display device of the projection type according to a fourth mode of the present invention is a shutter for a display device of the projection type according to the third mode wherein the guide means has, on the reverse rotation side relative to said predetermined angular position, a first guide member for guiding the opposite side edge portions of the light intercepting thin board member relative to the direction of movement of the light intercepting thin board member.

A shutter for a display device of the projection type according to a fifth mode of the present invention is a shutter for a display device of the projection type according to the third or fourth mode wherein the guide means has, on the forward rotation and reverse rotation sides relative to said predetermined angular position at least in the vicinity of said predetermined angular position, a second guide member for guiding the intermediate portion of the light intercepting thin board member in the direction of the central shaft.

A shutter for a display device of the projection type according to a sixth mode of the present invention is a shutter for a display device of the projection type according to the fifth mode wherein a portion of the second guide member which guides the forward rotation side portion of the light intercepting thin board member relative to said predetermined angular position has a shape following the outer surface of the take-up member and is disposed in proximity to the outer peripheral surface of the take-up member.

According to the shutter in accordance with the first to sixth modes, the characteristic of the light intercepting thin board member that it is deformable into a state in which it is rolled onto the outer surface of the take-up member and has a spring force for returning to a flat state is adroitly utilized, and the take-up member is rotated in the forward direction to thereby take up the light intercepting thin board member, whereby the light intercepting thin board member retracts from a light intercepting position and the light is brought into a liberated state, and also the take-up member is rotated in the reverse direction to thereby unroll the light intercepting thin board member, whereby the light intercepting thin board member becomes flat and moves forward to the light intercepting position and the light is brought into an intercepted state. What thus moves forward into the optical path is the light intercepting thin board member which is in the flat state and therefore, the shutter according to the first to sixth modes can be mounted even if it is placed in a narrow intercepting position space in the optical path. Also the light intercepting thin board member is adapted to be taken up by (or rolled onto) the take-up member during its retraction from the light intercepting position and therefore, as compared with a case where it slides intactly in its flat state and retracts from the light intercepting position, the space occupied by the shutter according to the first to sixth modes may be small and thus, the shutter can be mounted even in a narrow mounting space. The light intercepting thin board member is adapted to become flat and move forward to the light intercepting position, whereby the light is intercepted and therefore, a great deal of light can be completely intercepted.

Three shutters according to the first to sixth modes are prepared in case of use and each shutter is disposed at a position for intercepting each color light in the display device of the projection type during the forward movement of the light intercepting thin board member. Thereby, there is provided a display device of the projection type in which three color lights are caused to enter three respective spatial light modulating elements and the modulated lights of respective colors modulated by the three spatial light modulating elements are color-composited by color compositing means and are projected, or the modulated lights of respective colors are projected so as to be composited on a screen, and which is provided with three shutters according to the first to sixth modes and each shutter is disposed at a position for intercepting each color light in the display device of the projection type during the forward movement of the light intercepting thin board member. In the display device of the projection type provided with such shutters according to the first to sixth modes, one of the shutters is brought into a light liberating state and the remaining two shutters are brought into a light intercepting state, where each of the three color lights can be individually projected onto the screen completely independently of the other color lights and the color irregularity or the like of the projected light of each color can be observed. At this time, a light source can continue to be turned on and therefore, the changeover time of each color light only depends on the forward movement or retraction time of the light intercepting thin board member (i.e., the take-up or unrolling time of the take-up member), and this time can be, e.g. about 10 sec., which is very short as compared with a case where the light source is turned off and is again turned on, whereafter the time for the stabilization of luminosity is waited for. Though the interception and liberation of light cannot be effected at a high speed as by a camera shutter because the interception and liberation of light are effected by the utilization of the rotation of the take-up member, the shutters are used during the assembly adjustment of the display device of the projection type and therefore, it will suffice if they can intercept and liberate the light within e.g. about 10 sec.

Now, in the shutter according to the first to sixth modes, the interception and liberation of light can be effected by the take-up member being rotated and therefore, the take-up member can be rotated by an actuator such as a compact motor. In this case, any complicated mechanism for rotating the take-up member by a manual operation from the outside of the case of the display device of the projection type is not required, but the interception and liberation of light can be effected by giving a signal to the actuator from outside, and this is preferable.

In the first mode, the take-up member may be adapted to take up the light intercepting thin board member by two or more layers, but if as in the second mode, the outer circumferential length of the take-up member is made greater than the movement stroke of the light intercepting thin board member between the liberating state and the intercepting state, the take-up member will take up the light intercepting thin board member only in one layer, and the taking-up and unrolling of the light intercepting thin board member can be effected more stably, and this is preferable.

Also, if as in the third mode, the light intercepting thin board member is guided by the guide means, the taking-up and unrolling of the light intercepting thin board member can be effected stably, and this is preferable. Although the specific construction of this guide means is not specially restricted, for example, the first guide member as in the fourth mode or the second guide member as in the fifth mode can be used as the guide means. Also, the sixth mode is a further specific example of the second guide member.

DESCRIPTION OF THE PREFERRED EMBODIMENTS

A shutter for a display device of the projection type according to an embodiment of the present invention will hereinafter be described with reference to FIGS. 1A, 1B and 2A to 2C.

Figure 1A:
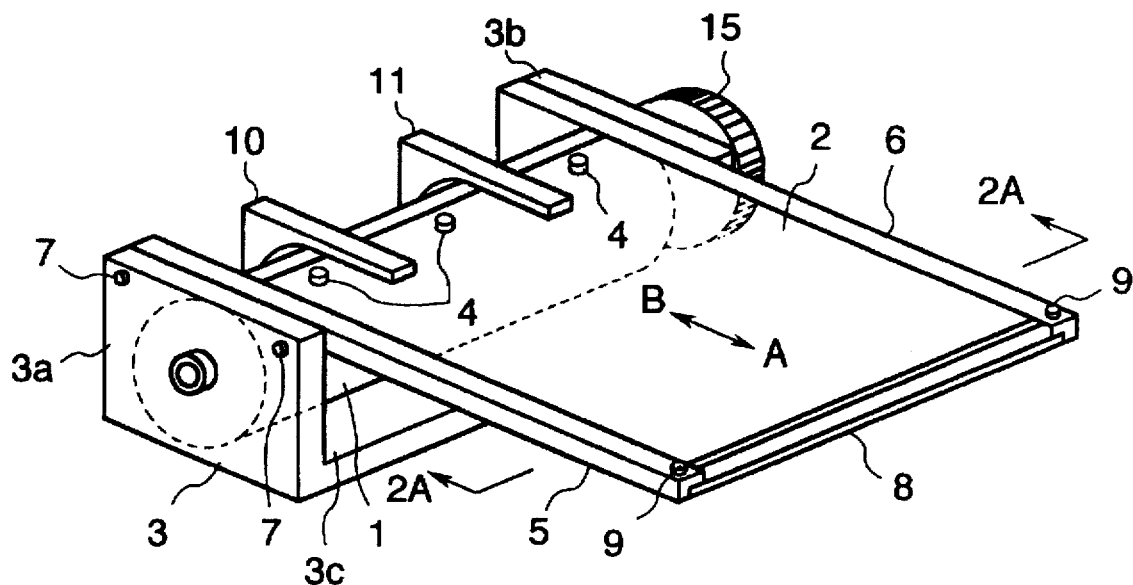
FIGS. 1A and 1B show the structure of a shutter according to an embodiment of the present invention, FIG. 1A being a perspective view showing the light intercepting state thereof, and FIG. 1B being a perspective view of the essential portions thereof showing the light liberating state thereof.
Figure 1B:
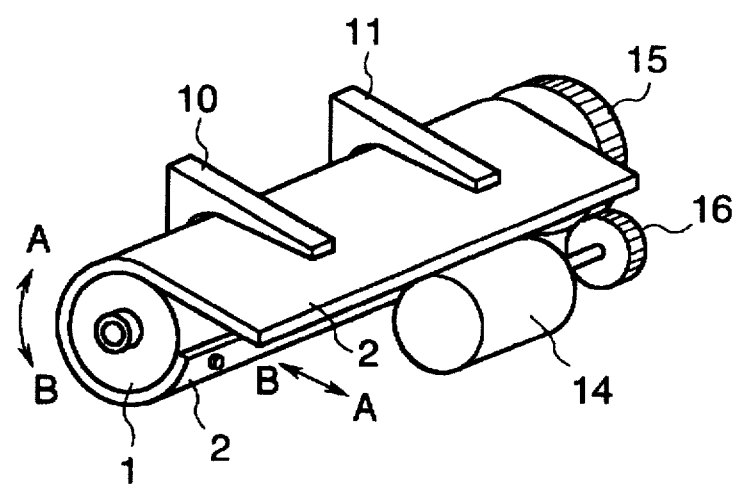
Figure 2A:
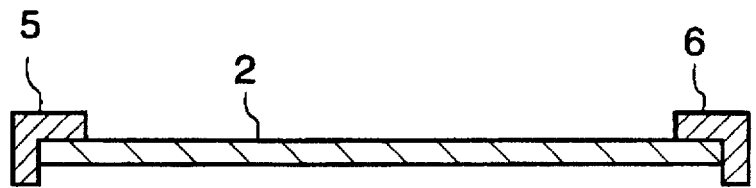
FIGS. 2A to 2C show some elements of the construction shown in FIGS. 1A and 1B, FIG. 2A being a cross-sectional view taken along the line 2A—2A in FIG. 1A, FIG. 2B being a cross-sectional view corresponding to FIG. 2A but showing another example of first guide member and FIG. 2C being a perspective view showing second guide members.
Figure 2B:
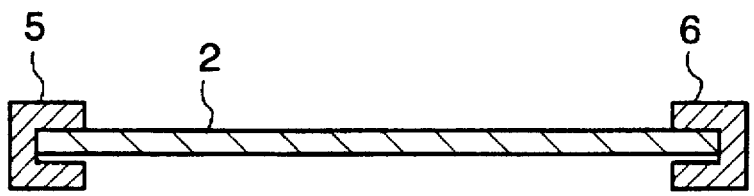
Figure 2C:
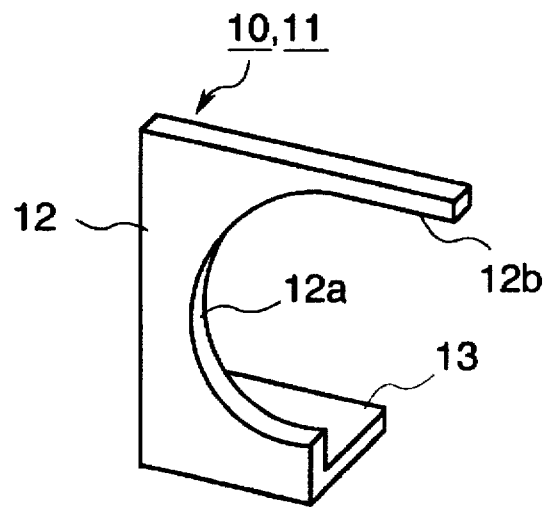

FIGS. 1A and 1B show the structure of the shutter according to an embodiment of the present invention, FIG. 1A being a perspective view showing the light intercepting state thereof, and FIG. 1B being a perspective view of the essential portions thereof showing the light liberating state thereof. In FIG. 1B, a base body 3 is not shown. FIGS. 2A to 2C show some elements of the construction shown in FIGS. 1A and 1B, FIG. 2A being a cross-sectional view taken along the line 2A—2A in FIG. 1A, FIG. 2B being a cross-sectional view corresponding to FIG. 2A, but showing another example of first guide members 5 and 6, and FIG. 2C being a perspective view showing second guide members 10 and 11.

The shutter according to the present embodiment, as shown in FIGS. 1A and 1B, is provided with a take-up member 1 rotatable about the central shaft thereof, and a light intercepting thin board member 2 having one end portion thereof fixed to the outer peripheral surface of the take-up member and deformable into a state rolled onto the outer peripheral surface of the take-up member 1 and having a spring force for returning to a flat state, and during the forward rotation of the take-up member 1, as shown in FIG. 1B, the light intercepting thin plate member 2 is adapted to be taken up or rolled onto the take-up member 1 and retracts from a desired light intercepting position to thereby bring light into a liberated state (a passing state), and during the reverse rotation of the take-up member 1, as shown in FIG. 1A, the light intercepting thin board member 2 is adapted to be unrolled from the take-up member 1 and assume a flat state and move forward to a light intercepting position to thereby bring the light into an intercepted state.

In the present embodiment, as the take-up member 1, use is made of a column-like metallic post member formed of aluminum or an aluminum alloy. However, the material of the take-up member 1 is not especially restricted, and the shape of the take-up member 1 may also be, for example, a hollow cylinder. The take-up member 1 is rotatably mounted on the opposite rising portions 3a and 3b of a base body 3 of a U-shaped cross-section (or any other cross-sectional shape).

Also, as the light intercepting thin board member 2, use is made of a metallic thin board member comprising a titanium thin board of a thickness 0.1 mm adapted to assume a rectangular shape in its flat state. However, as the light intercepting thin board member 2, use can also be made of a metallic thin board member such as a stainless thin board (SUS 304 cold-rolled material) or a copper alloy board (a beryllium copper thin board or a phosphor bronze thin board), or a thin board member formed of other material, and the thickness thereof is not limited to 0.1 mm. In the present embodiment, one end portion of the light intercepting thin board member 2 is fixed to the outer peripheral surface of the take-up member 1 by screws 4, but the fixing method is not restricted to screwing. When a metallic material is used for the light intercepting thin board member 2, it is preferable that an annealed material by heat treatment be not used. It is because a metallic material, when subjected to annealing, certainly becomes soft but loses suitable resiliency and therefore if this is used for the light intercepting thin board member 2, smooth discharge will become difficult during the discharge thereof and moreover, it will become difficult to secure the flatness of the discharged portion.

Also, the shutter according to the present embodiment, as shown in FIGS. 1A and 2A, with a predetermined angular position about the central shaft of the take-up member 1 (in the present embodiment, an angular position just above) as a reference, on the reverse rotation side (the unroll side, i.e., the forward movement side of the light intercepting thin board member 2, indicated by arrow A in FIG. 1A) relative to the predetermined angular position, is provided with first guide members 5 and 6 for guiding the opposite side portions of the light intercepting thin board member 2 relative to the direction of movement of the light intercepting thin board member 2. The light intercepting thin board member 2 is guided so as to be substantially along a predetermined plane on the reverse rotation side relative to said predetermined angular position chiefly by the first guide members 5 and 6. That is, in the present embodiment, the first guide members 5 and 6 are bar-like members of L-shaped cross-section formed of a stainless material (FIG. 2A), and are adapted to guide the upper portion and side portions of the light intercepting thin board member 2. However, the material of the first guide members 5 and 6 is not limited to a stainless material, and the cross-sectional shape of the light intercepting thin board member 2 may be a U-shape as shown, for example, in FIG. 2B. The first guide members 5 and 6 are fixed to the upper portions of the opposite rising portions 3a and 3b of the base body 3 by screws 7. Also, a beam 8 for reinforcement is fixed between the tip end portions of the first guide members 5 and 6 by screws 9.

Further, the shutter according to the present embodiment is provided, on the forward rotation side B (the take-up side, i.e., the retraction side of the light intercepting thin board member 2) and the reverse rotation side A (the unroll side, i.e., the forward movement side of the light intercepting thin board member 2) with respect to said predetermined angular position at least in the vicinity of said predetermined angular position, with second guide members 10 and 11 for guiding the intermediate portion of the light intercepting thin board member 2 in the direction of the central shaft. The second guide members 10 and 11 are formed of a stainless material, and each of them comprises a rising piece 12 and a horizontal piece 13, as shown in FIG. 2C. Although not shown, the horizontal piece 13 is fixed to the horizontal portion 3c of the base body 3. The rising piece 12 is formed with an arcuate portion 12a having a shape (arcuate shape) following the outer circumferential surface of the take-up member 1, as a portion for guiding the forward rotation side portion of the light intercepting thin board member 2 with respect to said predetermined angular position, and a straight portion 12b as a portion for guiding the reverse rotation side portion of the light intercepting thin board member 2 with respect to said predetermined angular position. The arcuate portion 12a and the straight portion 12b are continuous to each other with said predetermined angular position as the boundary. In the present embodiment, the arcuate portion 12a is formed in conformity with the outer diameter when the light intercepting thin board member 2 has been rolled on the take-up member 1 by one layer, and is proximate to the outer circumferential surface of the take-up member 1 so as to be along the outer surface of the take-up member 1 with a spacing substantially corresponding to the thickness of the light intercepting thin board member 2 from the outer peripheral surface of the take-up member 1. In the present embodiment, the arcuate portion 12a is formed over a range corresponding to 180°, but alternatively it may be formed only in a portion near said predetermined angular position. The arcuate portion 12a ensures the light intercepting thin board member 2 to be deformed against the spring force of the light intercepting thin board member 2 and taken up onto the outer surface of the take-up member 1. When the opposite side portions of the light intercepting thin board portion 2 which contact with the first guide members 5 and 6 are small, the light intercepting thin board member 2 is liable to be deformed by its resiliency, but the straight portion 12b acts to suppress the deformation and guide the reverse rotation side portion of the light intercepting thin board member 2 relative to said predetermined angular position so as to be along a predetermined plane. The straight portion 12b also acts to guide the light intercepting thin board member 2 smoothly to the arcuate portion 12a when the light intercepting thin board member 2 is taken up. The straight portion 12b is made shorter than the first guide members 5 and 6 so as not to extend to the light intercepting position.

The material of the second guide members 10 and 11 is neither restricted, but may be, for example, teflon or the like which can be expected to reduce the friction between it and the light intercepting thin board member 2. In that case, for the ease of working, use can be made of a block shape in which the thickness (the width in the direction of the central shaft of the take-up member 1) is greater, instead of the shape as shown in FIG. 2C wherein the thickness is small. If the thickness (width) of the second guide members is thus made great, the area which contacts with the horizontal portion 3c of the base body 3 can be secured and therefore, working such as bending for obtaining the horizontal piece 13 becomes unnecessary and the number of the second guide members can be one.

In the present embodiment, the aforedescribed first and second guide members 5, 6, 10 and 11, with said predetermined angular position about the central shaft of the take-up member 1 as a reference, constitute guide means for guiding the light intercepting thin board member 2 so as to be substantially along the outer circumferential surface of the take-up member 1 on the forward rotation side B relative to said predetermined angular position, and so as to be substantially along a predetermined plane on the reverse rotation side A relative to said predetermined angular position. In the present invention, however, other construction may also be adopted as such guide means.

Now, FIG. 1A shows the state when the light intercepting thin board member 2 has been most unrolled and most discharged from the take-up member 1, and FIG. 1B shows the state when the light intercepting thin board member 2 has been most taken up or rolled. As can be seen from these figures, the outer circumference length of the take-up member 1 is made 10 greater than the movement stroke of the light intercepting thin board member 2 between the light liberating state (FIG. 1B) and the light intercepting state (FIG. 1A) and thus, the take-up member 1 takes up the light intercepting thin board member 2 by one layer (That is, the wound thin board member does not overlap on the take-up member). If design is made such that the take-up member 1 thus takes up the light intercepting thin board member 2 by one layer, as previously described, the spacing between the arcuate portions 12a of the second guide members 10 and 11 and the outer circumferential surface of the take-up member 1 can be made to substantially correspond to the thickness of the light intercepting thin board member 2 and the spacing can be made narrow and therefore, as compared with a case where assuming that the light intercepting thin board member 2 is taken up onto the take-up member 1 by two or more layers, the spacing therebetween is widened, the guiding of the light intercepting thin board member 2 by the arcuate portions 12a becomes smooth. Accordingly, the take-up and unrolling of the light intercepting thin board member can be effected more stably, and this is preferable. Also, if the outer circumference length of the take-up member 1 is too small, the take-up and unrolling (discharging) of the light intercepting thin board member 2 along the outer circumferential surface of the take-up member 1 will become difficult because of the resiliency of the light intercepting thin board member 2, although the first and second guide members 5, 6, 10 and 11 are present. From this point as well, it is preferable to make the outer circumference length of the take-up member 1 greater than the movement stroke of the light intercepting thin board member 2. However, the present invention does not exclude a construction in which the light intercepting thin board member 2 is taken up onto the take-up member 1 by two or more layers, but such a construction is also covered by the scope of the present invention.

Further, the shutter according to the present embodiment is provided with a compact motor 14 as an actuator for rotating the take-up member 1. Although not shown, this motor 14 is mounted on the horizontal portion 3c of the base body 3. A gear 15 fixed to the central shaft of the take-up member 1 and a gear 16 fixed to the drive shaft of the motor 14 are in meshing engagement with each other. As the motor 14, it is preferable to use a stepping motor capable of simply effecting positioning control without requiring a position detector such as an encoder. If use is thus made of the actuator for rotating the take-up member 1, a signal can be given from the outside to the actuator to thereby effect the interception and liberation of the light without requiring any complicated mechanism for rotating the take-up member 1 by a manual operation from the outside of the case of the display device of the projection type, and this is preferable. In the present invention, however, design may be made such that without the use of the actuator, the take-up member 1 can be rotated by a manual operation.

According to the shutter in accordance with the present embodiment, when a signal is given to the motor 14 to thereby rotate the take-up member 1 to a predetermined rotated position, as shown in FIG. 1B, the light intercepting thin board member 2 is guided by the first and second guide members 5, 6, 10 and 11 and is taken up onto the take-up member 1, and the light intercepting thin board member 2 retracts from its light intercepting position and the light is liberated or allowed to pass. Also, when a signal is given to the motor 14 to thereby reversely rotate the take-up member 1 to a predetermined rotated position, as shown in FIG. 1A, the light intercepting thin board member 2 is guided by the first and second guide members 5, 6, 10 and 11 and is unrolled from the take-up member 1, and the light intercepting thin board member 2 moves forward to its light intercepting position and the light is intercepted. What thus moves into the optical path is the light intercepting thin board member 2 in its flat state and therefore, the shutter according to the present embodiment can be mounted even in a place wherein the intercepting position space in the optical path is narrow. Also, during the retraction of its light intercepting position, the light intercepting thin board member 2 is taken up by the take-up member 1 and therefore, as compared with a case where the light intercepting thin board member slides in its flat state and retracts from its light intercepting position, the space occupied by the shutter according to the present embodiment may be small and the shutter can be mounted even in a small mounting space. By the light intercepting thin board member 2 in its flat state moving forward to its light intercepting position, the light is intercepted and therefore, a great deal of light can be completely intercepted.

Three shutters according to the present embodiment are prepared during use, and each shutter is disposed at a position for intercepting each color light in the display device of the projection type during the forward movement of the light intercepting thin board member.

Figure 3:
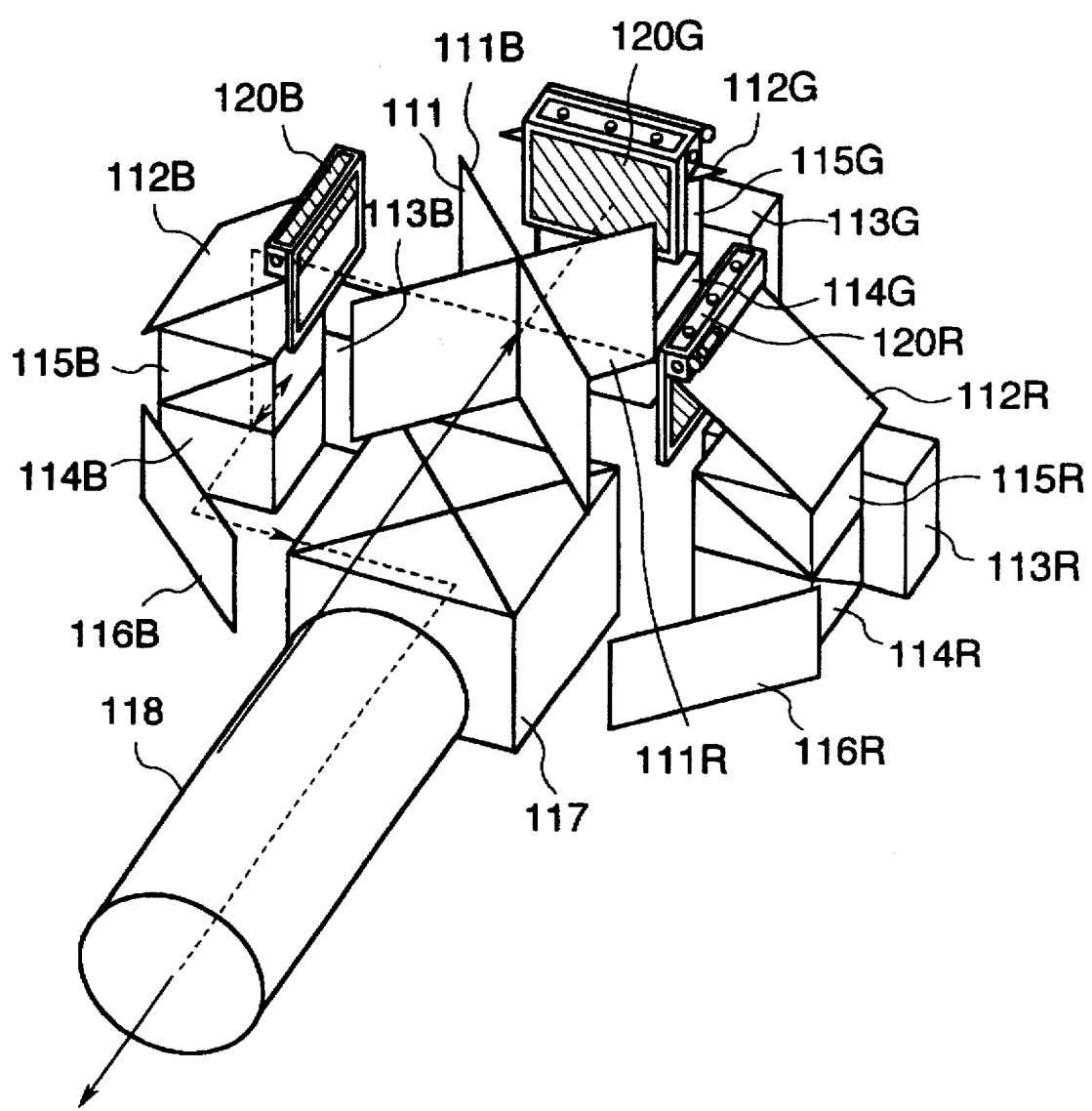
FIG. 3 is a perspective view showing an example of a display device of the projection type carrying therein the shutter according to an embodiment of the present invention.
Figure 4:
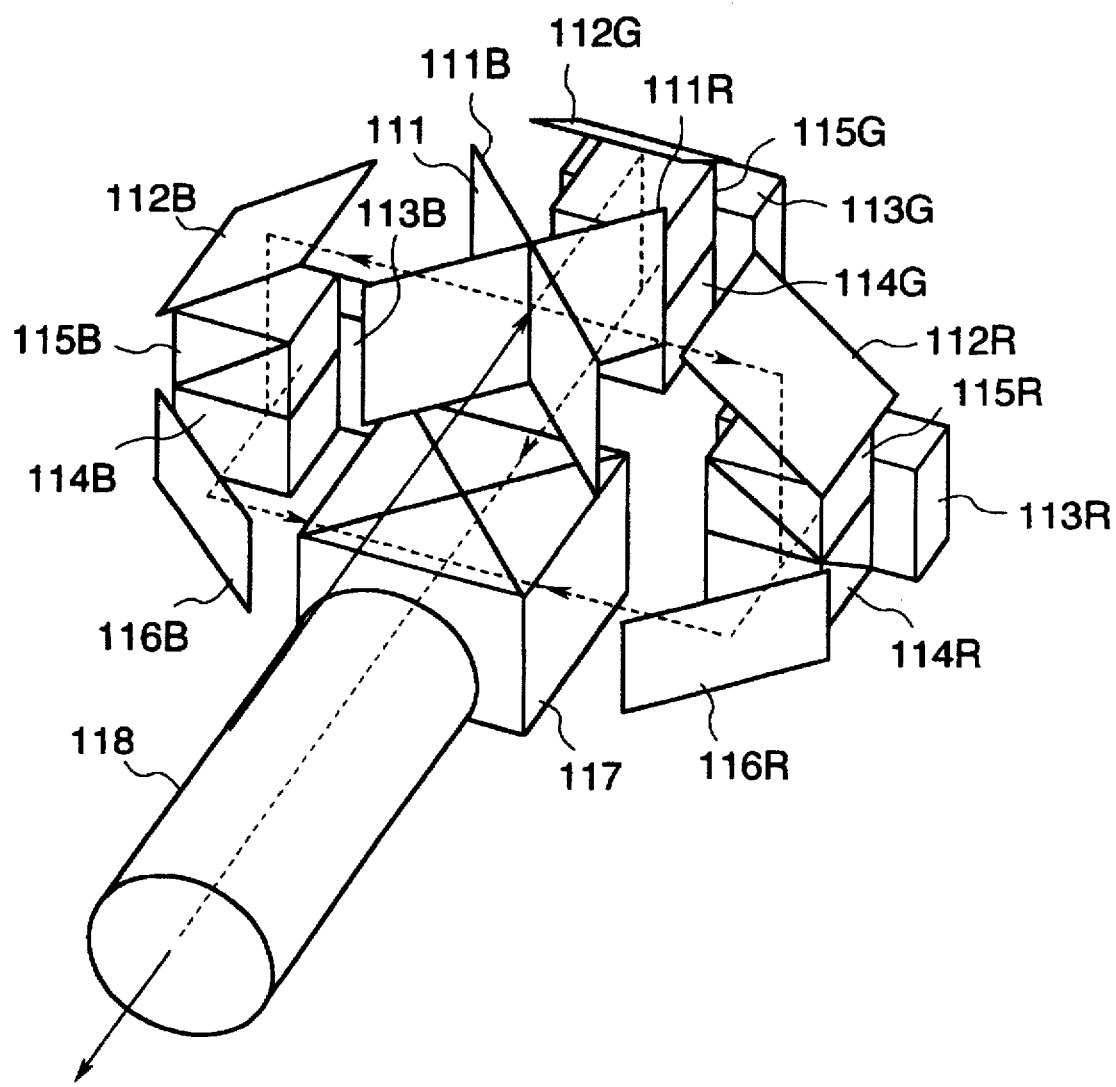
FIG. 4 is a perspective view schematically showing the construction of a display device of the projection type according to the prior art.
Figure 5:
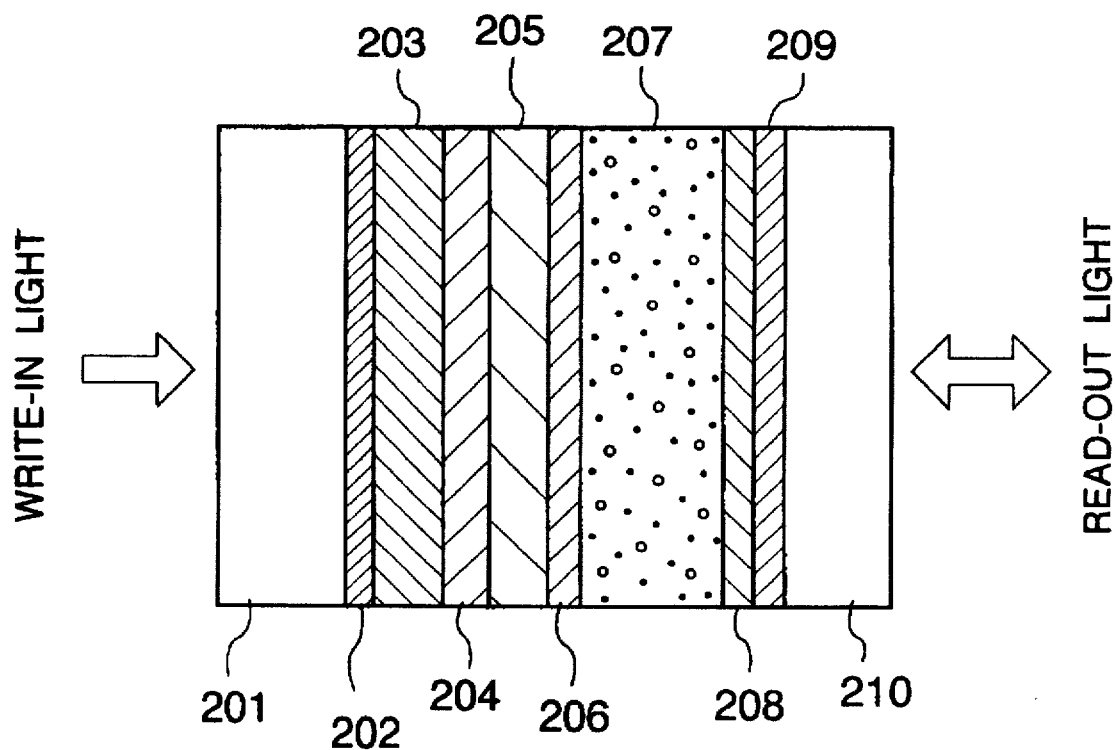
FIG. 5 is a cross-sectional view showing an example of a spatial light modulating element.

FIG. 3 shows an example of a display device of the projection type in which there are disposed three shutters 120R, 120G and 120B according to the present embodiment. The display device of the projection type shown in FIG. 3 is of the same type as the aforedescribed display device of the projection type shown in FIG. 4, with the exception that the shutters 120R, 120G and 120B are disposed therein and therefore, in FIG. 3, the same constituents as those in FIG. 4 are given the same reference characters and need not be described.

In this example, as shown in FIG. 3, the shutters 120R, 120G and 120B are disposed immediately before color lights or beams R, G and B separated by the cross dichroic mirror 111 enter the mirrors 112R, 112G and 112B, respectively. That is, the shutters 120R, 120G and 120B are disposed so that the light intercepting thin board member 2 may move forward from the upper portions of the mirrors 112R, 112G and 112B to thereby intercept the optical axes of the color lights or beams R, G and B. There is little space between the cross dichroic mirror 111 and the mirrors 112R, 112G, 112B, but by such a design that the take-up member 1 is disposed at the upper end portions of the mirrors 112R, 112G and 112B, the light intercepting thin board member 2 can be disposed so as to move forward into this narrow space, and the interception and liberation of the beam of each color light are possible.

In FIG. 3, there is shown a state in which only the B light is projected and the G light and R light are intercepted. The G light and R light are intercepted by the respective light intercepting thin board members 2 of the shutters 120G and 120R and therefore do not travel any further. The B light passed through the shutter 120B is reflected by the mirror 112B and enters the polarization beam splitters 115B and 114B. The polarized light (S-polarized light as viewed from the polarization beam splitter 114B) reflected by the polarization beam splitter 114B enters the spatial light modulating element 113B as read-out light. At this time, the B light is subjected to modulation in accordance with the write-in light of the spatial light modulating element 113B, and is reflected and emerges from the spatial light modulating element 113B.

In a spatial light modulating element of the light write-in type, the polarized state of light reflected by and emerging from the element is modulated in accordance with write-in light. In the construction of the present embodiment, if write-in light is caused to uniformly enter the entire write-in area, ideally all the reflected light from the spatial light modulating element 113B passes through the polarization beam splitter 114B, is reflected by the mirror 116B, is reflected by the cross dichroic prism 117 and is projected onto a screen by the projection lens 118, and the projected image of the B monochromatic light is observed. Thus, one of the shutters 120R, 120G and 120B is brought into the light liberating state and the other two are brought into the light intercepting state, whereby each of the three color lights can be individually projected onto the screen completely independently of the other color lights and the color irregularity or the like of the projected light of each color can be observed. At this time, the light source can continue to be turned on and therefore, the changeover time of the color lights only depends on the forward movement or retraction time of the light intercepting thin board member 2 (i.e., the take-up or unrolling time of the take-up member 1). This time can be e.g. about 10 sec., which is very short as compared with a case where the light source is once turned off and again turned on and thereafter the time for the stabilization of luminosity is waited for. However, since the interception and liberation of the light are effected by the utilization of the rotation of the take-up member 1, the interception and liberation of the light cannot be effected at a high speed as in a camera shutter, but yet the shutters 120R, 120G and 120B are used during the assembly adjustment of the display device of the projection type and therefore, it will suffice if the interception and liberation of the light can be effected within e.g. about 10 sec.

In the above-described display device of the projection type, the spatial light modulating elements 113R, 113G and 113B are spatial light modulating elements of the light write-in type, but of course, use can also be made of spatial light modulating elements of the electrical write-in type which effect modulation by electrically switching for each picture element.

Also, in the display device of the projection type shown in FIG. 3, the shutters 120R, 120G and 120B are disposed immediately before the color lights separated by the cross dichroic mirror 111 enter the mirrors 112R, 112G and 112B, but the location at which they are disposed is not restricted to that location. For example, in FIG. 3, the locations of the shutters 120R, 120G and 120B may be immediately before the respective color lights enter the polarization beam splitters 115R, 115G and 115B, or immediately before the spatial light modulating elements 113R, 113G and 113B.

The display device of the projection type which can use the shutter according to the present embodiment is not restricted to the display device of the projection type shown in FIG. 3, but may be, for example, one using spatial light modulating elements of the transmission type as the spatial light modulating elements, or one which does not effect color composite in advance, but projects the color lights by three projection lenses and composites them on a screen.

While an embodiment of the present invention has been described above, the present invention is not restricted to the above-described embodiment.

As described above, the shutter of the present invention can be carried in a display device of the projection type to thereby individually project each color light completely independently of the other color lights, and does not so much time for the changeover of the color light to be projected and moreover can be mounted in a narrow place.

What is claimed is:

1. A shutter for a display device of the projection type comprising:

a cylindrical take-up member rotatable about the central shaft thereof; and a thin board member having one end portion thereof fixed to the outer surface of said take-up member and deformable into a state rolled on the outer peripheral surface of said take-up member and having a spring force for returning to a flat state;

said thin board member being capable of operating between a liberating position in which in conformity with the rotated position of said take-up member, it is rolled onto said take-up member and retracts from a predetermined optical path to thereby permit the passage of light in said optical path and an intercepting position in which it is unrolled from said take-up member and assumes a flat shape and protrudes into said predetermined optical path to thereby intercept the light.

2. A shutter for a display device of the projection type according to claim 1, wherein the outer circumference length of said take-up member is greater than the movement stroke of said thin board member between said liberating position and said intercepting position.

3. A shutter for a display device of the projection type according to claim 1, further comprising a guide structure for guiding said thin board member, said guide structure being effective to guide said thin board member substantially along the outer circumferential surface of said take-up member, with a predetermined angular position about said central shaft of said take-up member as a reference, on a rolling side on which said thin board member is taken up by said take-up member relative to said predetermined angular position, and to guide said thin board member substantially along a predetermined plane on an unrolling side on which said thin board member is unrolled relative to said predetermined angular position.

4. A shutter for a display device of the projection type according to claim 3, wherein said guide structure has, on said rolling side relative to said predetermined angular position, a first guide member for guiding the opposite side edge portions of said thin board member.

5. A shutter for a display device of the projection type according to claim 3, wherein said guide structure has, on both of the rolling side and the unrolling side relative to said predetermined angular position at least in the vicinity of said predetermined angular position, a second guide member for guiding the intermediate portion of said thin board member in the direction of said central shaft.

6. A shutter for a display device of the projection type according to claim 4, wherein said guide structure has, on both of the rolling side and the unrolling side relative to said predetermined angular position at least in the vicinity of said predetermined angular position, a second guide member for guiding the intermediate portion of said thin board member in the direction of said central shaft.

7. A shutter for a display device of the projection type according to claim 5, wherein that portion of said second guide member which guides said thin board member on said rolling side has a shape following the outer circumferential surface of said take-up member, and is disposed in proximity to the outer surface of said take-up member.

8. A shutter for a display device of the projection type according to claim 6, wherein that portion of said second guide member which guides said thin board member on said rolling side has a shape following the outer circumferential surface of said take-up member, and is disposed in proximity to the outer surface of said take-up member.

9. A shutter for a display device of the projection type according to claim 1, further comprising a driving device for driving said take-up member to thereby rotate it.

10. A shutter for a display device of the projection type according to claim 4, wherein said first guide member includes portions cantilever-supported on said rolling side for guiding the opposite side edge portions of said thin board member, and a beam portion connecting said cantilever-supported portions together at the tip end portions thereof.

* * * * *